(12) United States Patent
Wang et al.

(10) Patent No.: US 12,465,789 B1
(45) Date of Patent: Nov. 11, 2025

(54) BORON NEUTRON CAPTURE THERAPY DEVICE COMPATIBLE WITH ROTATING TARGET AND FIXED TARGET AND TARGET REPLACEMENT METHOD

(71) Applicant: Huapeng Neutron Technology (Hangzhou) Co., Ltd., Hangzhou (CN)

(72) Inventors: Sheng Wang, Hangzhou (CN); Yaocheng Hu, Hangzhou (CN); Jingjing Fan, Hangzhou (CN); Yupeng Xie, Hangzhou (CN); Xingyang Lin, Hangzhou (CN)

(73) Assignee: Huapeng Neutron Technology (Hangzhou) Co., Ltd., Hangzhou (CN)

( * ) Notice: Subject to any disclaimer, the term of this patent is extended or adjusted under 35 U.S.C. 154(b) by 0 days.

(21) Appl. No.: 19/212,810

(22) Filed: May 20, 2025

(30) Foreign Application Priority Data

Jun. 24, 2024 (CN) .......................... 202410814360.9

(51) Int. Cl.
*A61N 5/10* (2006.01)
*G21G 4/02* (2006.01)
*H05H 3/06* (2006.01)

(52) U.S. Cl.
CPC ............. *A61N 5/1077* (2013.01); *G21G 4/02* (2013.01); *H05H 3/06* (2013.01); *A61N 2005/109* (2013.01)

(58) Field of Classification Search
CPC .. A61N 5/1077; A61N 2005/109; G21G 4/02; H05H 3/06
See application file for complete search history.

(56) References Cited

U.S. PATENT DOCUMENTS

| | | | |
|---|---|---|---|
| 10,820,404 B2* | 10/2020 | Cross | H05H 3/04 |
| 11,024,437 B2* | 6/2021 | Park, Jr. | G21G 4/02 |
| 11,980,148 B2* | 5/2024 | Isozaki | C12M 35/00 |
| 2017/0062086 A1* | 3/2017 | Park, Jr. | G21G 4/02 |
| 2018/0352643 A1* | 12/2018 | Park, Jr. | H05H 6/00 |

(Continued)

FOREIGN PATENT DOCUMENTS

| | | | | |
|---|---|---|---|---|
| CN | 108401354 A | * | 8/2018 | ......... H05K 7/20218 |
| CN | 118075967 A | * | 5/2024 | ............... H05H 7/14 |

(Continued)

*Primary Examiner* — David A Vanore
(74) *Attorney, Agent, or Firm* — Bayramoglu Law Offices LLC

(57) ABSTRACT

A boron neutron capture therapy device compatible with a rotating target and a fixed target and a target replacement method are provided, including a beam shaping body and a vacuum pipeline, where the beam shaping body includes a base platform, two sides of the base platform are each provided with a reflector module and a back reflector, and a compatible cavity capable of accommodating a rotating target module is disposed on the base platform; when the rotating target is adopted, the rotating target module is mounted in the compatible cavity, and the vacuum pipeline is connected with the rotating target module; and when the fixed target is adopted, the fixed target is detachably mounted on the vacuum pipeline. The boron neutron capture therapy device can meet the arrangement requirements of the fixed target and the rotating target at the same time, which is convenient for adjustment and updating of apparatuses.

20 Claims, 8 Drawing Sheets

(56) References Cited

U.S. PATENT DOCUMENTS

| | | | |
|---|---|---|---|
| 2020/0069974 A1* | 3/2020 | Piestrup | G21G 4/02 |
| 2021/0051795 A1* | 2/2021 | Mezei | H05H 3/06 |
| 2021/0272716 A1* | 9/2021 | Park, Jr. | G21G 1/10 |
| 2023/0125432 A1* | 4/2023 | Lee | A61K 41/0095 |
| | | | 376/108 |
| 2023/0210072 A1* | 7/2023 | Isozaki | C12M 35/00 |
| | | | 800/276 |

FOREIGN PATENT DOCUMENTS

| | | | | |
|---|---|---|---|---|
| CN | 118380178 A | * | 7/2024 | G21K 1/067 |
| CN | 119031562 A | * | 11/2024 | H05H 3/06 |
| EP | 4147750 A1 | * | 3/2023 | A61N 5/1077 |
| JP | 2008022920 A | * | 2/2008 | A61N 5/1081 |

* cited by examiner

BORON NEUTRON CAPTURE THERAPY DEVICE COMPATIBLE WITH ROTATING TARGET AND FIXED TARGET AND TARGET REPLACEMENT METHOD

CROSS REFERENCE TO THE RELATED APPLICATIONS

This application is based upon and claims priority to Chinese Patent Application No. 202410814360.9, filed on Jun. 24, 2024, the entire contents of which are incorporated herein by reference.

TECHNICAL FIELD

The present invention relates to the technical field of nuclear medicine radiotherapy, and more particularly to a boron neutron capture therapy device compatible with a rotating target and a fixed target and a target replacement method.

BACKGROUND

Boron Neutron Capture Therapy (BNCT) is a binary treatment method that combines a targeted drug with a neutron beam. By irradiating tumor cells enriched with boron drugs with a neutron beam of a certain energy, the nuclear reaction confined within the range of the tumor cells is utilized to destroy cancer cells, so as to achieve the effect of precisely killing the cancer cells without damaging normal cells.

The neutron source target is a component for generating neutrons, mainly including a fixed target and a rotating target. During the initial design, due to the different connection methods between the fixed target and the rotating target and the accelerator, as well as the different docking methods with the beam shaping device, generally, one of the two schemes of the fixed target or the rotating target is selected, and the compatibility between the two is not considered, which will impose limitations on the future updates of apparatuses. Secondly, for the compatibility of the fixed target and the rotating target, the on-site layout and the impact on neutron performance and shielding after replacement need to be considered. However, the current common apparatuses can only achieve the mounting of a single fixed target or rotating target, and cannot achieve the compatible mounting of both, which brings inconvenience to the adjustment and update of the apparatuses.

SUMMARY

In order to overcome the above deficiencies, the present invention provides a boron neutron capture therapy device compatible with a rotating target and a fixed target and a target replacement method. The boron neutron capture therapy device can meet the arrangement requirements of the fixed target and the rotating target at the same time, without the need to replace or extensively disassemble the beam shaping device. On the one hand, it is based on apparatus upgrade space, and on the other hand, the applicability of the treatment device is improved.

In order to solve the above technical problems, the present invention adopts the following technical solution: a boron neutron capture therapy device compatible with a rotating target and a fixed target, including a beam shaping body and a vacuum pipeline, where the beam shaping body includes a base platform, two sides of the base platform are each provided with a reflector module and a back reflector, and a compatible cavity capable of accommodating a rotating target module is disposed on the base platform; when the rotating target is adopted, the rotating target module is mounted in the compatible cavity, and the vacuum pipeline is connected with the rotating target module; and when the fixed target is adopted, the fixed target is detachably mounted on the vacuum pipeline.

The boron neutron capture therapy device is provided with a base platform, and a compatible cavity is disposed on the base platform, providing sufficient mounting space for the rotating target. Moreover, a modular rotating target module is adopted, and the modular setting facilitates the operation after replacing the rotating target or the fixed target. During the replacement operation, only the back reflector needs to be adjusted, and there is no need to adjust the reflector module and other components, which can ensure the neutron performance after replacement.

The boron neutron capture therapy device in this patent application can meet the arrangement requirements of the fixed target and the rotating target at the same time, without the need to replace or extensively disassemble the beam shaping device. On the one hand, it is based on apparatus upgrade space, and on the other hand, the applicability of the beam shaping device is improved, providing more neutron treatment parameters for different cancer cases. The rotating target and the fixed target can be compatibly replaced, enabling the device to meet different neutron flux requirements according to the progress of different periods, leaving sufficient space for apparatus iteration, standby emergency, etc.

The fixed target is detachably mounted on the vacuum pipeline. The vacuum pipeline passes through the back reflector, making the fixed target close to the reflector module. When the rotating target is adopted, the fixed target is disassembled. After the rotating target module is mounted in the compatible cavity, the vacuum pipeline is connected with the rotating target module. The same back reflector is adopted to avoid radiation damage caused by neutron recoil.

Preferably, the base platform and the reflector module are correspondingly provided with a mounting groove, and the reflector module is adaptively connected with the mounting groove.

The reflector module is adaptively mounted in the mounting groove on the base platform, which is convenient and reliable for mounting. At the same time, it can shorten a distance between a moderator core inside the reflector module and the target material, reduce the possibility of proton scattering, and contribute to increasing the flux of a neutron beam. At this time, the base platform also acts as a reflector.

Preferably, a fully through hole for the fixed target to pass through is disposed on the base platform.

When the fixed target is adopted, the vacuum pipeline can pass through the fully through hole and get closer to the moderator core, reducing the possibility of proton scattering and contributing to increasing the flux of a neutron beam. At this time, the base platform also acts as a reflector.

Preferably, a moderator core is disposed inside the reflector module, a sinking groove is disposed on the base platform, the fully through hole is disposed at a bottom of the sinking groove, and one end of the moderator core is placed in the sinking groove.

As an optimized design, the sinking groove can make the moderator core closer to the target material. The setting of the sinking groove allows the moderator core to further extend out of the reflector module and get closer to the target material. The base platform acts as a reflector at the same time.

Preferably, a surface of the base platform sinks to form the compatible cavity.

The surface of the base platform sinks to form the compatible cavity, and the base platform can completely isolate front and back sides.

As another solution, the base platform has a frame-like structure, and internal space of the base platform of the frame-like structure forms the compatible cavity.

The base platform of the frame-like structure can make the reflector module and the back reflector closer, shorten a distance between the moderator core inside the reflector module and the target material, reduce the possibility of proton scattering, and contribute to increasing the flux of a neutron beam.

Preferably, a fixed seat is disposed below the base platform, an adjusting cushion block is mounted at a bottom of the base platform, a plurality of liftable support columns are mounted on the fixed seat, and the support columns support the adjusting cushion block.

The support columns support the adjusting cushion block, thereby achieving the support of the base platform. Moreover, the support columns can be lifted to adjust a height, which facilitates adjustment of a position of the base platform in a mounting process.

As another solution, a fixed seat is disposed below the base platform, a base platform cushion block and a reflector cushion block are disposed on the fixed seat, a back reflector cushion block is disposed on the base platform cushion block, liftable base platform support columns and liftable reflector support columns are mounted on the fixed seat, liftable back reflector support columns are mounted on the base platform cushion block, the base platform support columns support the base platform cushion block, the reflector support columns support the reflector cushion block, and the back reflector support columns support the back reflector cushion block; and the base platform is mounted on the base platform cushion block, the reflector module is mounted on the reflector cushion block, and the back reflector is mounted on the back reflector cushion block.

A height of the base platform is adjusted through lifting movement of the base platform support columns, a mounting height of the reflector module is adjusted through lifting movement of the reflector support columns, and a height position of the back reflector is adjusted through lifting movement of the back reflector support columns. In a mounting process, height position adjustment assists in mounting to achieve alignment.

Preferably, a movably disposed curtain is mounted on the base platform, and movement of the curtain is capable of blocking the rotating target module or the fixed target in a direction of neutron transmission.

When the boron neutron capture therapy device is working normally, the curtain is disposed in a staggered position with the target material, and the curtain will not block in the direction of neutron transmission, nor will it block the target material and the reflector module. The moderator core inside the reflector module needs to be replaced regularly. When the moderator core needs to be replaced on a treatment side, the curtain moves to block in the direction of neutron transmission. The curtain isolates the target material and the neutron source, and then the moderator core is replaced. At this time, because the gamma rays emitted by a target are isolated by the curtain, the staff can replace the moderator core under the condition of no target radioactive irradiation.

After the replacement of the moderator core is completed, the curtain returns to its original position, and is disposed in a staggered position with the target material, and no longer blocks in the direction of neutron transmission.

Preferably, the base platform is provided with a connecting groove, a sliding rail is mounted inside the connecting groove, a sliding seat is slidably mounted on the sliding rail, the curtain is tightly connected with the sliding seat, a slot is disposed on a side wall of the connecting groove, and the curtain is adaptively connected with the slot in a plug-in manner.

The connecting groove disposed on the base platform facilitates the layout and mounting of the curtain. The sliding seat connected to the curtain moves along the sliding rail, enabling the curtain to move within the slot on the base platform, which is stable and reliable.

Preferably, a through hole is disposed on the curtain, and the movement of the curtain makes the through hole align with or misalign with and separate from the direction of neutron transmission.

When the through hole is aligned with the direction of neutron transmission, the curtain can occupy relatively large space between the moderator core and the target material. At this time, the curtain acts as a reflector, reducing the possibility of proton scattering. The curtain moves upward to make the through hole misalign with and separate from the direction of neutron transmission, and the curtain moves to block in the direction of neutron transmission.

Preferably, the rotating target module includes a mounting housing and the rotating target located inside the mounting housing, the rotating target includes a target disk and target materials, the target disk is connected to a main shaft, and a plurality of target materials are circumferentially disposed on the target disk to form an annular structure.

When the rotating target is in operation, the target disk and the main shaft operate together, enabling the plurality of target materials to continuously align with the vacuum pipeline. A sweeping size of a beam spot is expanded through rotating motion, thereby reducing the thermal power density on the target materials, which is beneficial for prolonging the service life of the target materials.

A method for replacing a rotating target and a fixed target of a boron neutron capture therapy device, where a target replacement operation for the boron neutron capture therapy device compatible with a rotating target and a fixed target is achieved, including replacing the fixed target with a rotating target and replacing the rotating target with a fixed target; the replacing the fixed target with a rotating target includes steps of:

S1. separating the vacuum pipeline and the back reflector from each other, and transferring the back reflector; S2. mounting the rotating target module to the compatible cavity, and disassembling the fixed target on the vacuum pipeline; S3. re-mounting the back reflector to a position of the compatible cavity, with the back reflector close to the rotating target; and S4. passing the vacuum pipeline through the back reflector, and connecting the vacuum pipeline with the rotating target to achieve target replacement; and the replacing the rotating target with a fixed target includes steps of:

separating the vacuum pipeline from the rotating target, and moving the vacuum pipeline outward to retreat to an exterior of the back reflector; b. transferring the back reflector; c. transferring the rotating target module; d. re-mounting the back reflector to a position of the compatible cavity; and e. mounting the fixed target on the vacuum pipeline, and extending the vacuum pipeline into the back reflector to achieve target replacement.

In the process of replacing the fixed target with the rotating target, only the steps of disassembling and mounting the back reflector, disassembling the fixed target, and mounting the rotating target module are required. In the process of replacing the rotating target with the fixed target, only the steps of disassembling and mounting the back reflector, disassembling the rotating target module, and mounting the fixed target are required.

In the process of replacing the fixed target and the rotating target, only the disassembly and mounting of the back reflector, the disassembly or mounting of the rotating target module, and the mounting or disassembly of the fixed target are performed, without the need to assemble and disassemble other modules and components, and it is convenient to operate.

Compared with the prior art, the beneficial effects of the present invention are as follows: (1) the boron neutron capture therapy device can meet the arrangement requirements of the fixed target and the rotating target at the same time, without the need to replace or extensively disassemble the beam shaping device. On the one hand, it is based on apparatus upgrade space, and on the other hand, the applicability of the beam shaping device is improved; (2) the modular rotating target module is adopted, enabling both the rotating target and the fixed target to meet the mounting requirements. The modular setting allows the same back reflector to be adopted after replacing the rotating target or the fixed target, avoiding radiation damage caused by neutron recoil and increasing the neutron flux at the same time. During the replacement operation, only the back reflector needs to be adjusted, and there is no need to adjust the reflector module and other components, which can ensure the neutron performance after replacement; (3) when the moderator core needs to be replaced on the treatment side, the curtain isolates the target material and the neutron source. Therefore, the moderator core can be replaced without removing the target material. At this time, because the gamma rays emitted by the target are isolated by the curtain, the staff can replace the moderator core under the condition of no target radioactive irradiation; (4) the height position of the base platform can be adjusted in the mounting process, which facilitates the alignment and mounting; and (5) although the boron neutron capture therapy device is provided with the base platform, the setting of the fully through hole allows the moderator core to get as close to the target material as possible, reducing the possibility of proton scattering and contributing to increasing the flux of the neutron beam.

In the figures: 1. base platform, 2. reflector module, 3. compatible cavity, 4. back reflector, 5. proton beam channel, 6. vacuum pipeline, 7. rotating target module, 8. isolation cavity, 9. penetrating hole, 10. mounting groove, 11. curtain, 12. target material, 13. through hole, 14. fully through hole, 15. connecting groove, 16. sliding rail, 17. sliding seat, 18. slot, 19. plugging block, 20. fixed seat, 21. adjusting cushion block, 22. support column, 23. target disk, 24. main shaft, 52. sinking groove, 53. base platform cushion block, 54. reflector cushion block, 55. back reflector cushion block, 56. base platform support column, 57. reflector support column, 58. back reflector support column, and 59. shielding block.

DETAILED DESCRIPTION OF THE EMBODIMENTS

Figure 1:
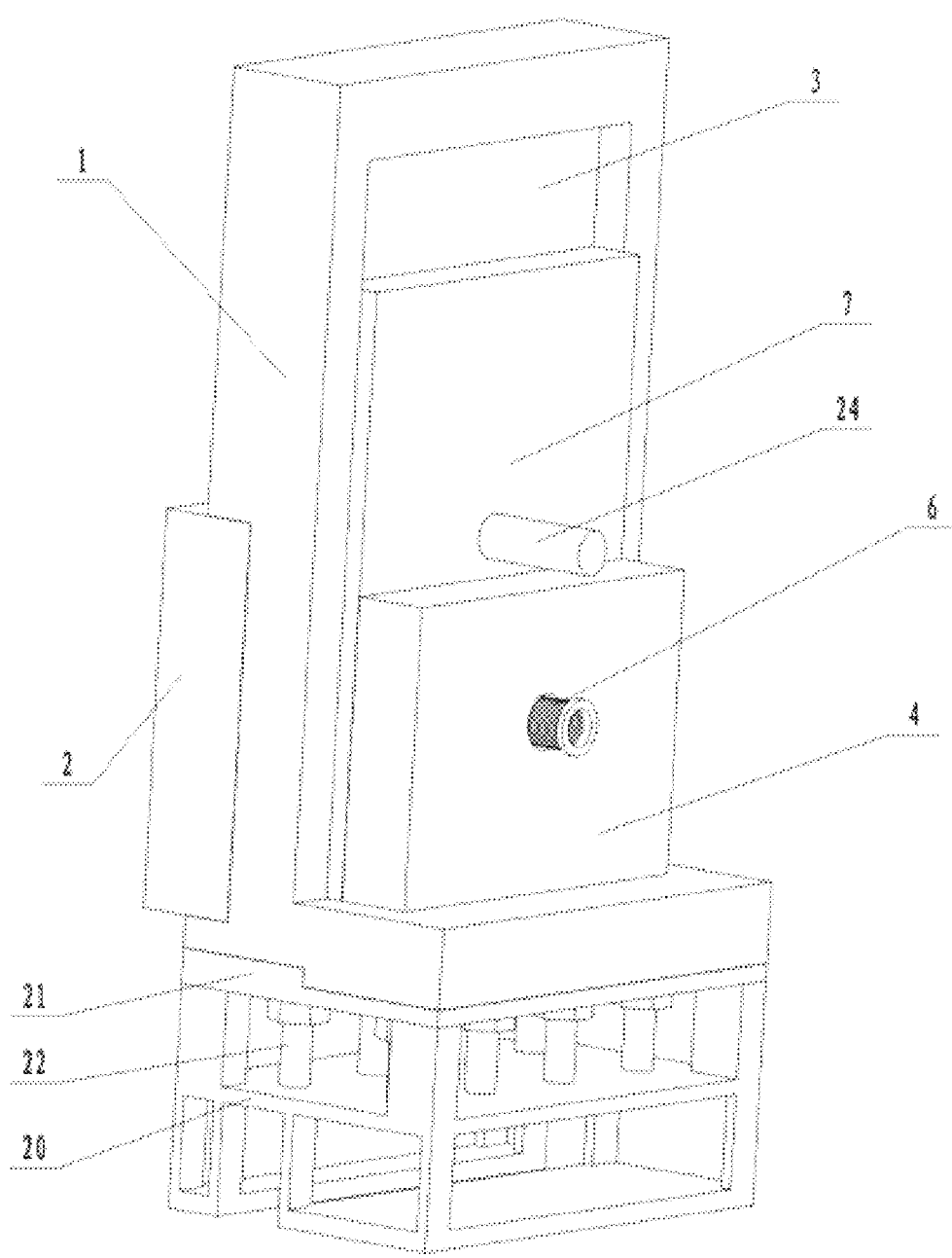
FIG. 1 is a schematic structural diagram of Embodiment 1 of the present invention.
Figure 2:
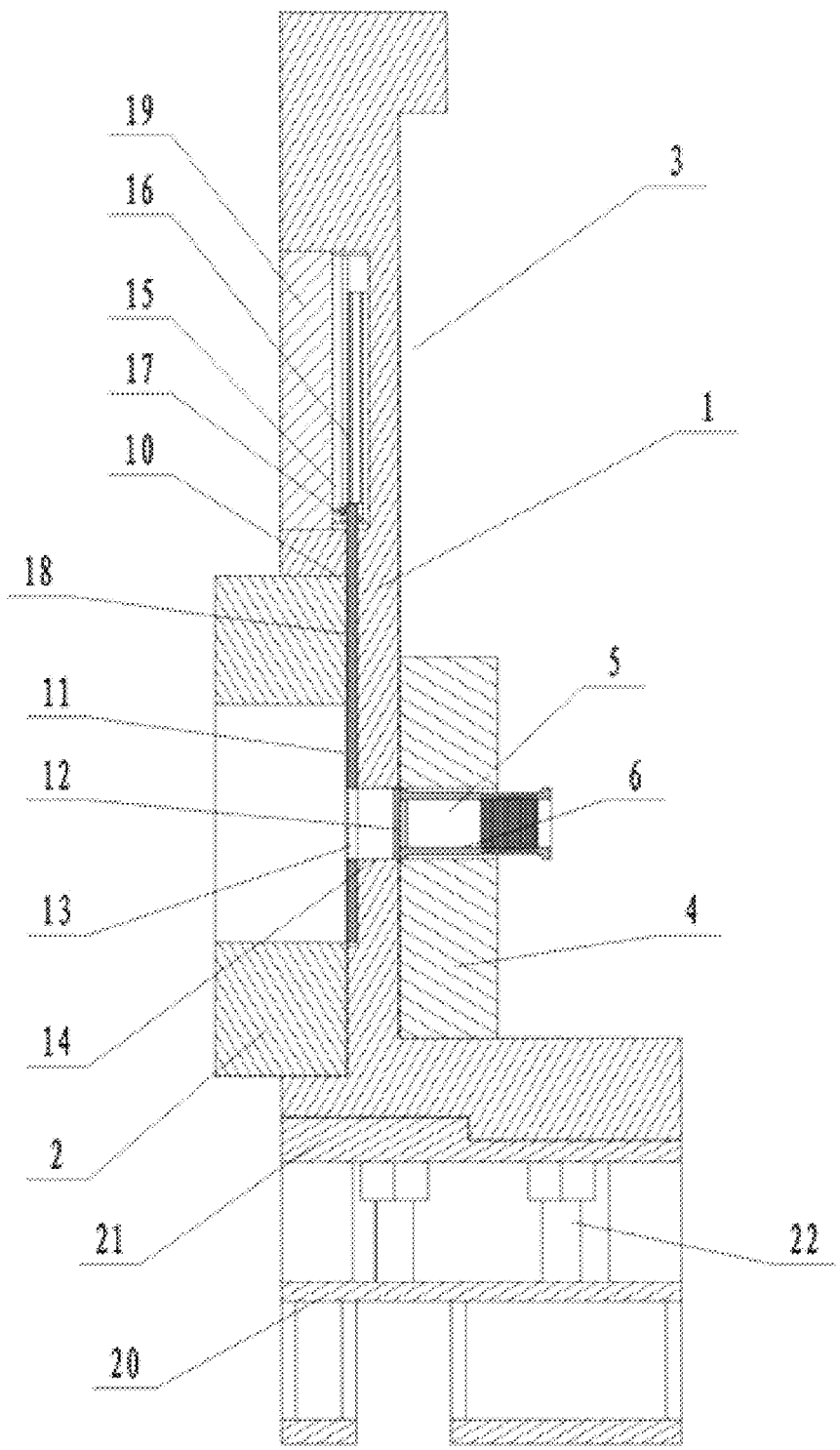
FIG. 2 is a cross-sectional view of Embodiment 1 of the present invention.

The technical solutions of the present invention will be further described in detail below through specific embodiments and in conjunction with the drawings:

Embodiment 1: a boron neutron capture therapy device compatible with a rotating target and a fixed target (see FIG. 1 and FIG. 2), including a beam shaping body and a vacuum pipeline 6, where the beam shaping body includes a base platform 1, front and back sides of the base platform 1 are each provided with a reflector module 2 and a back reflector 4, a moderator core is disposed inside the reflector module 2, and a compatible cavity 3 capable of accommodating a rotating target module 7 is disposed on the base platform 1. When the rotating target is adopted, the rotating target module 7 is mounted in the compatible cavity 3, and the vacuum pipeline 6 is connected with the rotating target module 7. When the fixed target is adopted, the fixed target is detachably mounted on the vacuum pipeline 6.

The reflector module 2 is mounted on the front side of the base platform 1, and the compatible cavity 3 is disposed on the back side of the base platform 1. A width of the rotating target module 7 is adapted to a width of the compatible cavity 3. A width of the back reflector 4 is or is not adapted to the width of the compatible cavity 3. When the width of the back reflector 4 is adapted to the width of the compatible cavity 3, a front side of the back reflector 4 can be adaptively mounted in the compatible cavity. If the width of the back reflector 4 cannot be adapted to the width of the compatible cavity 3, when the fixed target is adopted in the beam shaping body, an auxiliary block is mounted in the compatible cavity. Two sides of the auxiliary block each abut a bottom face of the compatible cavity 3 and a front side of the back reflector 4.

Lead is selected as the main material of the base platform 1, which can reflect recoil neutrons together with the back reflector 4 to increase neutron flux. Since the generated neutrons exist in all directions, the back reflector 4 needs to be disposed in an opposite direction of a neutron beam outlet to reduce the leakage of the recoil neutrons and increase the neutron flux. Generally, the back reflector 4 is made of lead, but it can also be replaced with BeO, polyethylene, etc. The base platform 1 is made of lead and can serve as a part of the back reflector 4. It can not only be mounted with a target body but also reflect neutrons.

A through hole is disposed on the back reflector 4. The vacuum pipeline 6 can be inserted into the through hole and move along the through hole. A cavity inside the vacuum pipeline 6 forms a proton beam channel 5. When the rotating target is adopted, the rotating target module 7 is detachably mounted inside the compatible cavity 3. An isolation cavity 8 is disposed inside the rotating target module 7, and a rotating target is mounted in the isolation cavity 8. The rotating target module 7 and the vacuum pipeline 6 are correspondingly provided with a penetrating hole 9. An end of the vacuum pipeline 6 can be detachably connected to an edge of the penetrating hole 9. When the fixed target is adopted, the fixed target is detachably mounted on the vacuum pipeline 6. The base platform 1 and the reflector module 2 are correspondingly provided with a mounting groove 10, and the reflector module 2 is adaptively connected with the mounting grooves 10. A fully through hole 14 for the fixed target to pass through is disposed on the base platform 1, and the fully through hole 14 serves as a connection between the compatible cavity 3 and the mounting groove 10. When the fixed target is mounted, it extends into the fully through hole 14 to shorten a distance between a target material and the moderator core.

A fixed seat 20 is disposed below the base platform 1, an adjusting cushion block 21 is mounted at a bottom of the base platform 1, a plurality of liftable support columns 22 are mounted on the fixed seat 20, and the support columns 22 support the adjusting cushion block 21.

An upper surface of the adjusting cushion block 21 and a lower surface of the base platform 1 both have a stepped structure. In a process of the lower surface of the base platform 1 being adaptively connected with the upper surface of the adjusting cushion block 21, the stepped structure facilitates accurate positioning. The support columns 22 are support screws. A nut end of the support screw abuts against the adjusting cushion block 21, and the support screw is in threaded connection with the fixed seat 20. Rotating the support screw enables fine adjustment of a support height.

The surface of the base platform 1 sinks to form the compatible cavity 3, enabling the base platform 1 to completely isolate the front and back sides. Except the fully through hole 14, other parts of the base platform 1 are completely closed.

A movably disposed curtain 11 is mounted on the base platform 1, and movement of the curtain 11 is capable of blocking the rotating target module 7 or the fixed target in a direction of neutron transmission. A target material 12 is disposed on both the rotating target and the fixed target. The curtain 11 moves and blocks between the target material 12 and the moderator core, and at this time, the curtain can block the target material 12. A through hole 13 is disposed on the curtain 11, and the through hole 13 is correspondingly disposed with the target material 12. Movement of the curtain 11 makes the through hole 13 align with or misalign with and separate from the target material 12. When the through hole 13 on the curtain 11 misaligns with and separates from the target material 12, the curtain 11 blocks the target material 12. The curtain moves upward, making the through hole 13 move upward and misalign with the fully through hole 14. The part below the through hole on the curtain covers the fully through hole 14, achieving the blocking of the target material 12.

The curtain 11 is mounted on the front side of the base platform 1, a connecting groove 15 is disposed on the front side of the base platform 1, a sliding rail 16 is mounted inside the connecting groove 15, a sliding seat 17 is slidably mounted on the sliding rail 16, the curtain 11 is tightly connected with the sliding seat 17, a slot 18 is disposed on a side wall of the connecting groove 15, and the curtain 11 is adaptively connected with the slot 18 in a plug-in manner. The sliding seat 17 is driven by a driving mechanism, and the driving mechanism is a piston cylinder or a driving motor. When the piston cylinder is adopted, a telescopic rod of the piston cylinder is connected with the sliding seat 17. When the driving motor is adopted, an output shaft of the driving motor is connected to a screw rod, the sliding seat 17 is in threaded connection with the screw rod, and the driving motor drives the screw rod to rotate, thereby achieving movement of the sliding seat 17. A plugging block 19 is mounted at an open end of the connecting groove 15.

The rotating target module 7 includes a mounting housing and the rotating target located inside the mounting housing, a cavity inside the mounting housing forms the isolation cavity 8, the rotating target includes a target disk 23 and target materials 12, the target disk 23 is connected to a main shaft 24, and a plurality of target materials 12 are circumferentially disposed on the target disk 23 to form an annular structure.

The boron neutron capture therapy device is provided with the base platform 1, and the compatible cavity 3 is disposed on the base platform 1, providing sufficient mounting space for the rotating target module 7. Moreover, the modular rotating target module 7 is adopted, and the modular setting facilitates the operation of replacing the rotating target or the fixed target. During the replacement operation, only the back reflector 4 needs to be adjusted, and there is no need to adjust the reflector module 2 and other components, which can ensure the neutron performance after replacement.

The boron neutron capture therapy device in this patent application can meet the arrangement requirements of the fixed target and the rotating target at the same time, without the need to replace or extensively disassemble the beam shaping device. On the one hand, it is based on apparatus upgrade space, and on the other hand, the applicability of the beam shaping device is improved. The rotating target and the fixed target can be compatibly replaced, enabling the device to meet different neutron flux requirements according to the progress of different periods, leaving sufficient space for apparatus iteration, standby emergency, etc.

The fixed target is detachably mounted on the vacuum pipeline 6. The vacuum pipeline 6 passes through the back reflector 4, making the fixed target close to the moderator core. When the rotating target is adopted, the fixed target is disassembled. After the rotating target module 7 is mounted in the compatible cavity 3, the vacuum pipeline 6 is connected with the rotating target module 7. The same back reflector 4 is adopted to avoid radiation damage caused by neutron recoil.

When the moderator core needs to be replaced on a treatment side, the curtain 11 isolates the target material and a neutron source. Therefore, the moderator core can be replaced without removing the target material 12. At this time, because the gamma rays emitted by the target are isolated by the curtain 11, the staff can replace the moderator core under the condition of no target radioactive irradiation. A height position of the base platform 1 can be adjusted in a mounting process, which facilitates the alignment and mounting. Although the base platform 1 is disposed on the boron neutron capture therapy device, the setting of the fully through hole 14 allows the moderator core to get as close to the target material 12 as possible, reducing the possibility of proton scattering and contributing to increasing the flux of a neutron beam.

A method for replacing a rotating target and a fixed target of a boron neutron capture therapy device, where a target replacement operation for the boron neutron capture therapy device compatible with a rotating target and a fixed target is achieved, including replacing the fixed target with a rotating target and replacing the rotating target with a fixed target; the replacing the fixed target with a rotating target includes steps of:

S1. separating the vacuum pipeline 6 disposed on the back reflector 4 from the back reflector 4, and transferring the back reflector 4, during the operation, directly moving the vacuum pipeline 6 backward to retreat to an exterior of the back reflector 4; S2. mounting the rotating target module 7 into the compatible cavity 3, and disassembling the fixed target on the vacuum pipeline 6; S3. re-mounting the back reflector 4 to a position of the compatible cavity 3, with the back reflector 4 close to the rotating target; and S4. passing the vacuum pipeline 6 through the back reflector 4, and connecting the vacuum pipeline 6 with the rotating target to achieve target replacement; and the replacing the rotating target with a fixed target includes steps of:

separating the vacuum pipeline 6 disposed on the back reflector 4 from the rotating target, and moving the vacuum pipeline 6 outward to retreat to an exterior of the back reflector 4; b. transferring the back reflector 4; c. transferring the rotating target module 7; d. re-mounting the back reflector 4 to a position of the compatible cavity 3; and e. mounting the fixed target on the vacuum pipeline 6, and extending the vacuum pipeline into the back reflector 4 until the fixed target extends into the fully through hole 14 on the base platform to achieve target replacement.

In the process of replacing the fixed target with the rotating target, only the steps of disassembling and mounting the back reflector 4, disassembling the fixed target, and mounting the rotating target module 7 are required. In the process of replacing the rotating target with the fixed target, only the steps of disassembling and mounting the back reflector 4, disassembling the rotating target module 7, and mounting the fixed target are required. In the process of replacing the fixed target and the rotating target, only the disassembly and mounting of the back reflector 4, the disassembly or mounting of the rotating target module 7, and the mounting or disassembly of the fixed target are performed, without the need to assemble and disassemble other modules and components, and it is convenient to operate.

Figure 3:
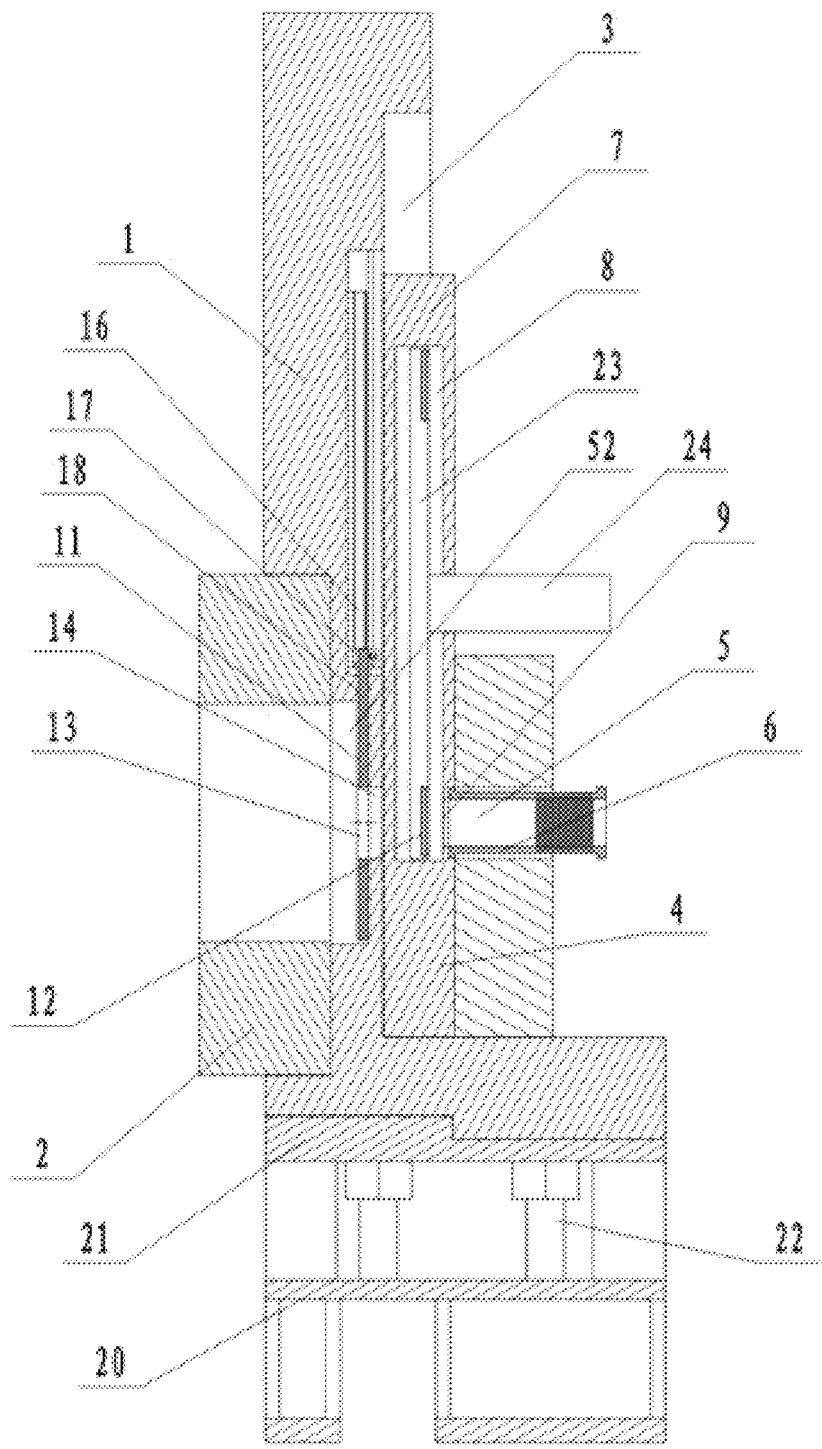
FIG. 3 is a cross-sectional view of Embodiment 2 of the present invention.

Embodiment 2: a boron neutron capture therapy device compatible with a rotating target and a fixed target (see FIG. 3). Its structure is similar to that of Embodiment 1. The main difference is that in this embodiment, a curtain 11 is mounted on a back side of a base platform 1, a connecting groove 15 is disposed at a bottom of a compatible cavity 3 on the back side of the base platform 1, and a width of the connecting groove 15 is smaller than a width of the compatible cavity 3. A sliding rail 16 is mounted inside the connecting groove 15, a sliding seat 17 is slidably mounted on the sliding rail 16, the curtain 11 is tightly connected with the sliding seat 17, a slot 18 is disposed on a lower side wall of the connecting groove 15, and the curtain 11 is adaptively connected with the slot 18 in a plug-in manner. The sliding seat 17 is driven by a driving mechanism, and the driving mechanism is a piston cylinder or a driving motor. When the piston cylinder is adopted, a telescopic rod of the piston cylinder is connected with the sliding seat 17. When the driving motor is adopted, an output shaft of the driving motor is connected to a screw rod, the sliding seat 17 is in threaded connection with the screw rod, and the driving motor drives the screw rod to rotate, thereby achieving movement of the sliding seat 17.

A moderator core is disposed inside a reflector module 2, a sinking groove 52 is disposed on the base platform 1, the sinking groove 52 is disposed on a bottom face of the mounting groove 10, a fully through hole 14 is disposed at a bottom of the sinking groove 52, and one end of the moderator core is placed in the sinking groove 52. A lower portion of the curtain 11 is placed in the sinking groove 52. Other structures are the same as those in Embodiment 1.

As an optimized design, the sinking groove 52 can make the moderator core closer to the target material 12. The setting of the sinking groove 52 allows the moderator core to further extend out of the reflector module 2 and get closer to the target material 12. The base platform 1 acts as a reflector at the same time.

Figure 4:
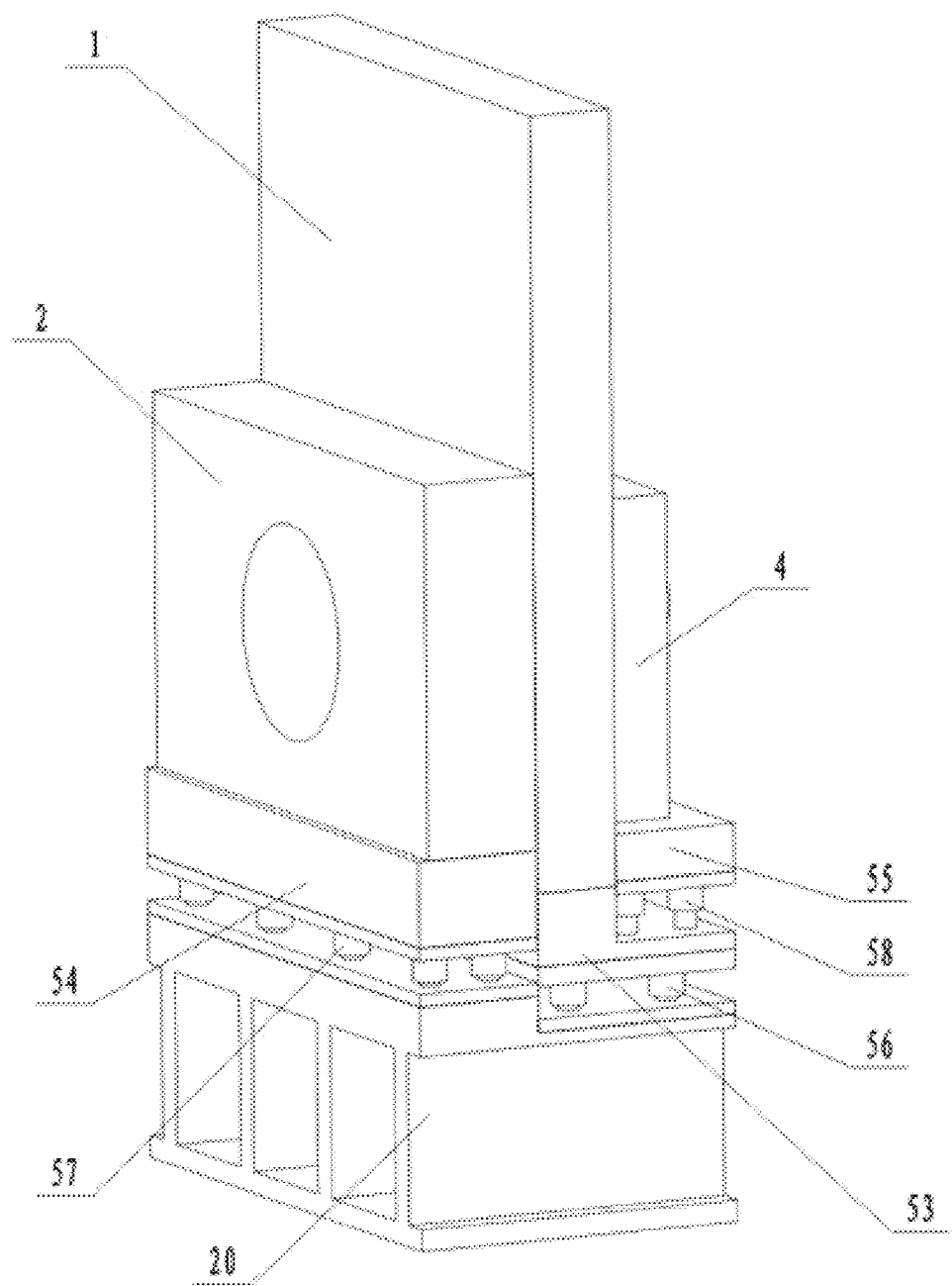
FIG. 4 is a schematic structural diagram of Embodiment 3 of the present invention.
Figure 5:
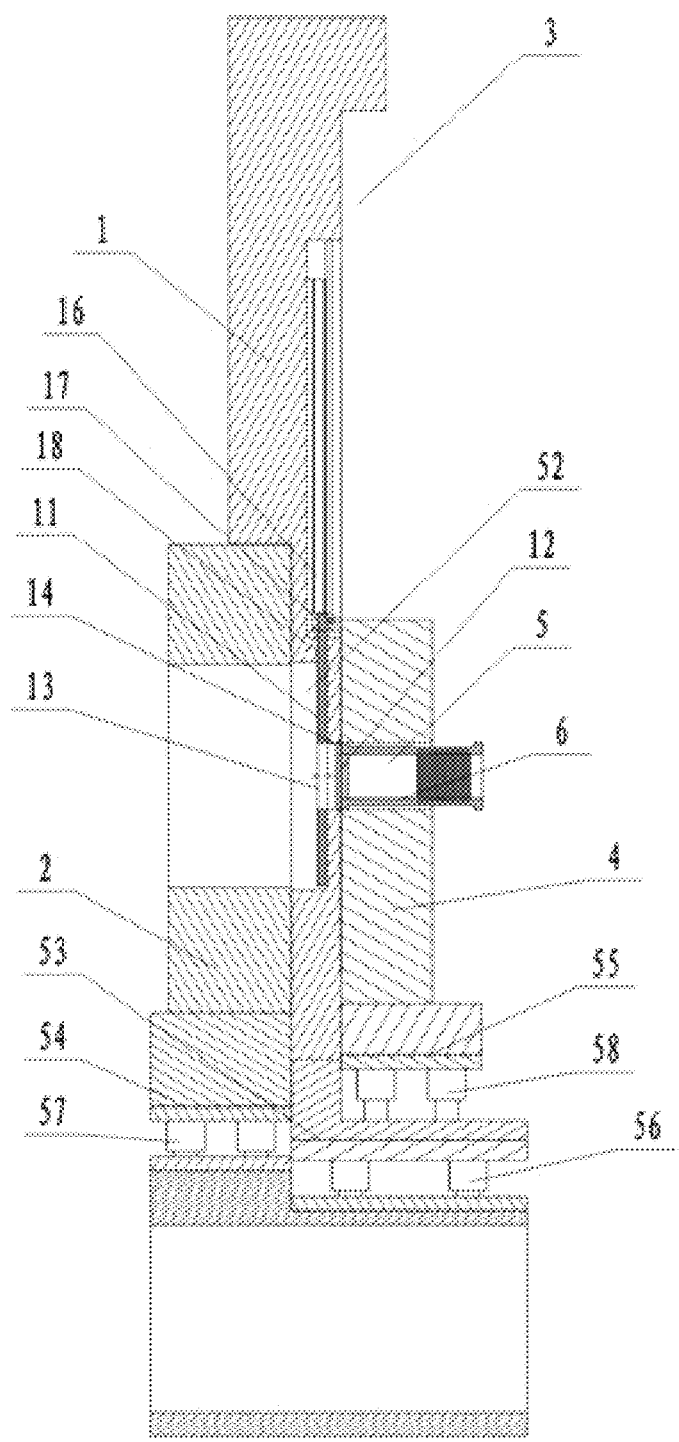
FIG. 5 is a cross-sectional view of Embodiment 3 of the present invention.

Embodiment 3: a boron neutron capture therapy device compatible with a rotating target and a fixed target (see FIG. 4 and FIG. 5). Its structure is similar to that of Embodiment 1. The main difference is that in this embodiment, a fixed seat 20 is disposed below a base platform 1, a base platform cushion block 53 and a reflector cushion block 54 are disposed on a fixed seat 20, a back reflector cushion block 55 is disposed on the base platform cushion block 53, liftable base platform support columns 56 and liftable reflector support columns 57 are mounted on the fixed seat 20, and liftable back reflector support columns 58 are mounted on the base platform cushion block 53, the base platform support columns 56 support the base platform cushion block 53, the reflector support columns 57 support the reflector cushion block 54, and the back reflector support columns 58 support the back reflector cushion block 55; and the base platform 1 is mounted on the base platform cushion block 53, a reflector module 2 is mounted on the reflector cushion block 54, and a back reflector 4 is mounted on the back reflector cushion block 55. The base platform support columns 56, the reflector support columns 57 and the back reflector support columns 58 are all support screws. Height adjustment is achieved through threaded connection, and nut ends of the support screws are on an upper side.

A height of the base platform 1 is adjusted through lifting movement of the base platform support columns 56, a mounting height of the reflector module 2 is adjusted through lifting movement of the reflector support columns 57, and a height position of the back reflector 4 is adjusted through lifting movement of the back reflector support columns 58. In a mounting process, height position adjustment assists in mounting to achieve alignment.

A connecting groove 15 is disposed at a bottom of a compatible cavity 3 on a back side of the base platform 1. A width of the connecting groove 15 is smaller than a width of the compatible cavity 3. A sliding rail 16 is mounted inside the connecting groove 15, a sliding seat 17 is slidably mounted on the sliding rail 16, a curtain 11 is tightly connected with the sliding seat 17, a slot 18 is disposed on a side wall of the connecting groove 15, and the curtain 11 is adaptively connected with the slot 18 in a plug-in manner. The sliding seat 17 is driven by a driving mechanism, and the driving mechanism is a piston cylinder or a driving motor. When the piston cylinder is adopted, a telescopic rod of the piston cylinder is connected with the sliding seat 17. When the driving motor is adopted, an output shaft of the driving motor is connected to a screw rod, the sliding seat 17 is in threaded connection with the screw rod, and the driving motor drives the screw rod to rotate, thereby achieving movement of the sliding seat 17. A moderator core is disposed inside the reflector module 2, a sinking groove 52 is disposed on the base platform 1, the fully through hole 14 is disposed at a bottom of the sinking groove 52, and one end of the moderator core is placed in the sinking groove 52. The sinking groove 52 is disposed at a bottom of a mounting groove 10. A lower portion of the curtain 11 is placed in the sinking groove 52. Other structures are the same as those in Embodiment 1.

Figure 6:
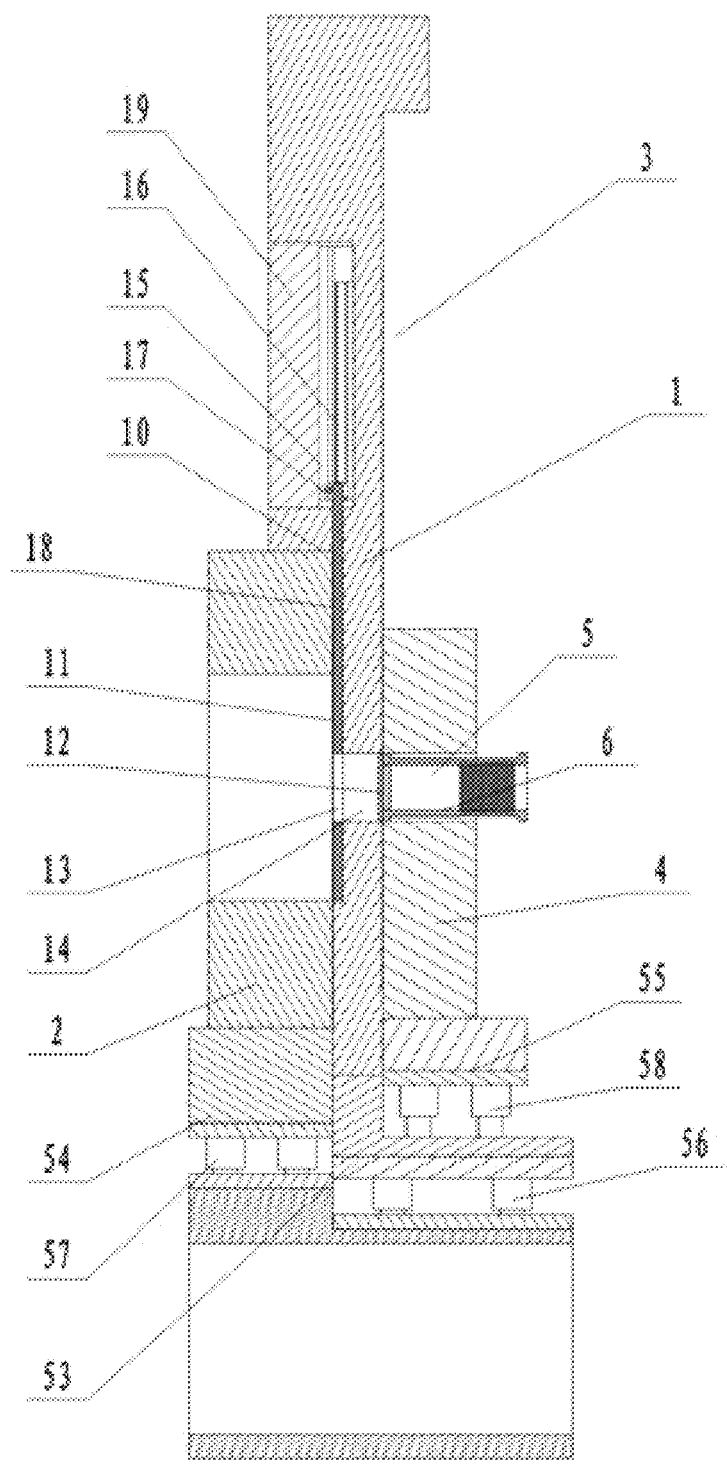
FIG. 6 is a cross-sectional view of Embodiment 4 of the present invention.

Embodiment 4: a boron neutron capture therapy device compatible with a rotating target and a fixed target (see FIG. 6). Its structure is similar to that of Embodiment 1. The main difference is that in this embodiment, a fixed seat 20 is disposed below a base platform 1, a base platform cushion block 53 and a reflector cushion block 54 are disposed on a fixed seat 20, a back reflector cushion block 55 is disposed on the base platform cushion block 53, liftable base platform support columns 56 and liftable reflector support columns 57 are mounted on the fixed seat 20, and liftable back reflector support columns 58 are mounted on the base platform cushion block 53, the base platform support columns 56 support the base platform cushion block 53, the reflector support columns 57 support the reflector cushion block 54, and the back reflector support columns 58 support the back reflector cushion block 55; and the base platform 1 is mounted on the base platform cushion block 53, a reflector module 2 is mounted on the reflector cushion block 54, and a back reflector 4 is mounted on the back reflector cushion block 55. The base platform support columns 56, the reflector support columns 57 and the back reflector support columns 58 are all support screws. Height adjustment is achieved through threaded connection, and nut ends of the support screws are on an upper side.

A height of the base platform 1 is adjusted through lifting movement of the base platform support columns 56, a mounting height of the reflector module 2 is adjusted through lifting movement of the reflector support columns 57, and a height position of the back reflector 4 is adjusted through lifting movement of the back reflector support columns 58. In a mounting process, height position adjustment assists in mounting to achieve alignment. Other structures are the same as those in Embodiment 1.

Figure 7:
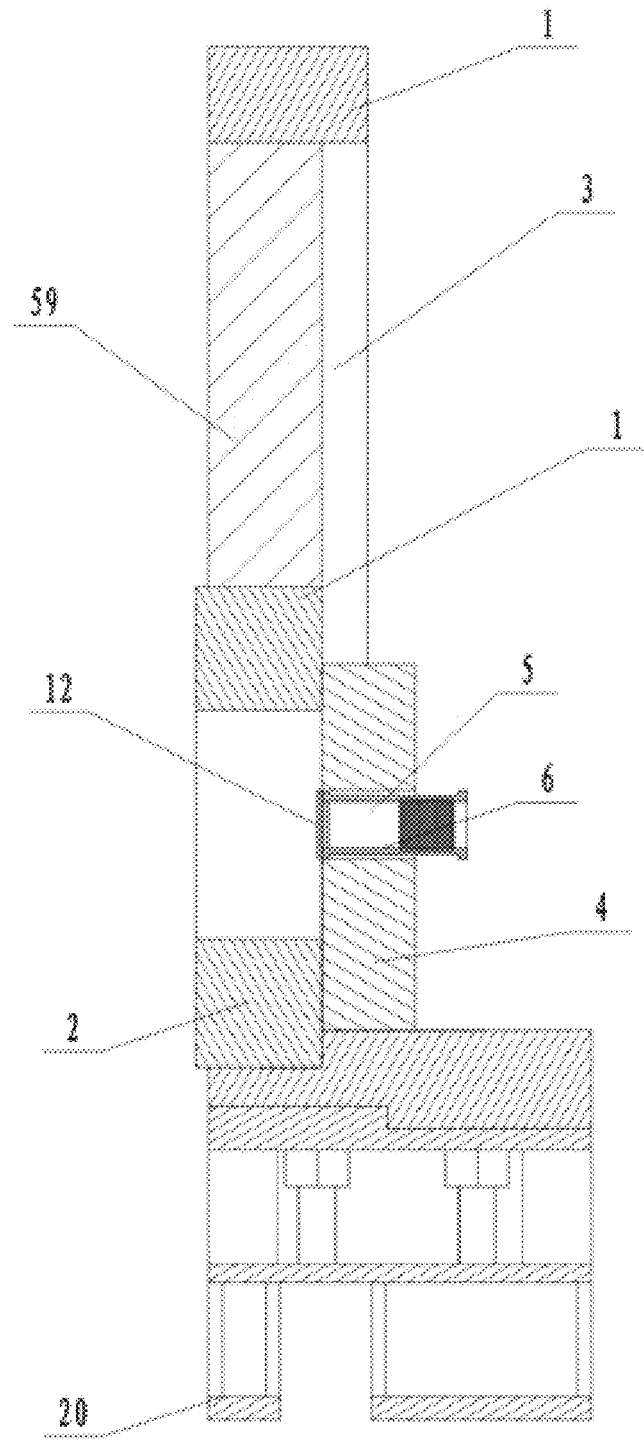
FIG. 7 is a cross-sectional view of Embodiment 5 of the present invention.

Embodiment 5: a boron neutron capture therapy device compatible with a rotating target and a fixed target (see FIG. 7). Its structure is similar to that of Embodiment 1 and Embodiment 3. The main difference is that in this embodiment, a base platform 1 has a frame-like structure, and internal space of the base platform 1 of the frame-like structure forms a compatible cavity 3. A shielding block is mounted above a reflector module 2 inside the compatible cavity 3. When a fixed target is adopted, the reflector module 2 and a back reflector 4 directly abut each other, the fixed target is close to a moderator core, and the base platform is disposed on a periphery of the reflector module 2 and the back reflector 4. When a rotating target is adopted, front and back sides of a rotating target module 7 each abut the reflector module 2 and the back reflector 4. In this embodiment, a curtain 11 is no longer disposed, and a mounting groove 10, a sinking groove 52 and a fully through hole 14 are no longer disposed on the base platform 1. Other structures are the same as those in Embodiment 1 or Embodiment 3.

A method for replacing a rotating target and a fixed target of a boron neutron capture therapy device, where a target replacement operation for the boron neutron capture therapy device compatible with a rotating target and a fixed target is achieved, including replacing the fixed target with a rotating target and replacing the rotating target with a fixed target; the replacing the fixed target with a rotating target includes steps of:

S1. separating a vacuum pipeline 6 disposed on the back reflector 4 from the back reflector 4, and transferring the back reflector 4, during the operation, directly moving the vacuum pipeline 6 backward to retreat to an exterior of the back reflector 4; S2. mounting the rotating target module 7 into the compatible cavity 3, and disassembling the fixed target on the vacuum pipeline 6; S3. re-mounting the back reflector 4 to a position of the compatible cavity 3, with the back reflector 4 close to the rotating target, and connecting the reflector module 2, the rotating target module 7 and the back reflector 4 in an abutting manner; and S4. extending the vacuum pipeline 6 into the back reflector 4, and connecting the vacuum pipeline 6 with the rotating target to achieve target replacement; and the replacing the rotating target with a fixed target includes steps of:

separating the vacuum pipeline 6 disposed on the back reflector 4 from the rotating target, and moving the vacuum pipeline 6 outward to retreat to an exterior of the back reflector 4; b. transferring the back reflector 4; c. transferring the rotating target module 7; d. re-mounting the back reflector 4 to a position of the compatible cavity 3, and connecting the reflector module 2 and the back reflector 4 in an abutting manner; and e. mounting the fixed target on the vacuum pipeline 6, and extending the vacuum pipeline into the back reflector 4 until the fixed target extends to a back side of the reflector module to achieve target replacement.

Figure 8:
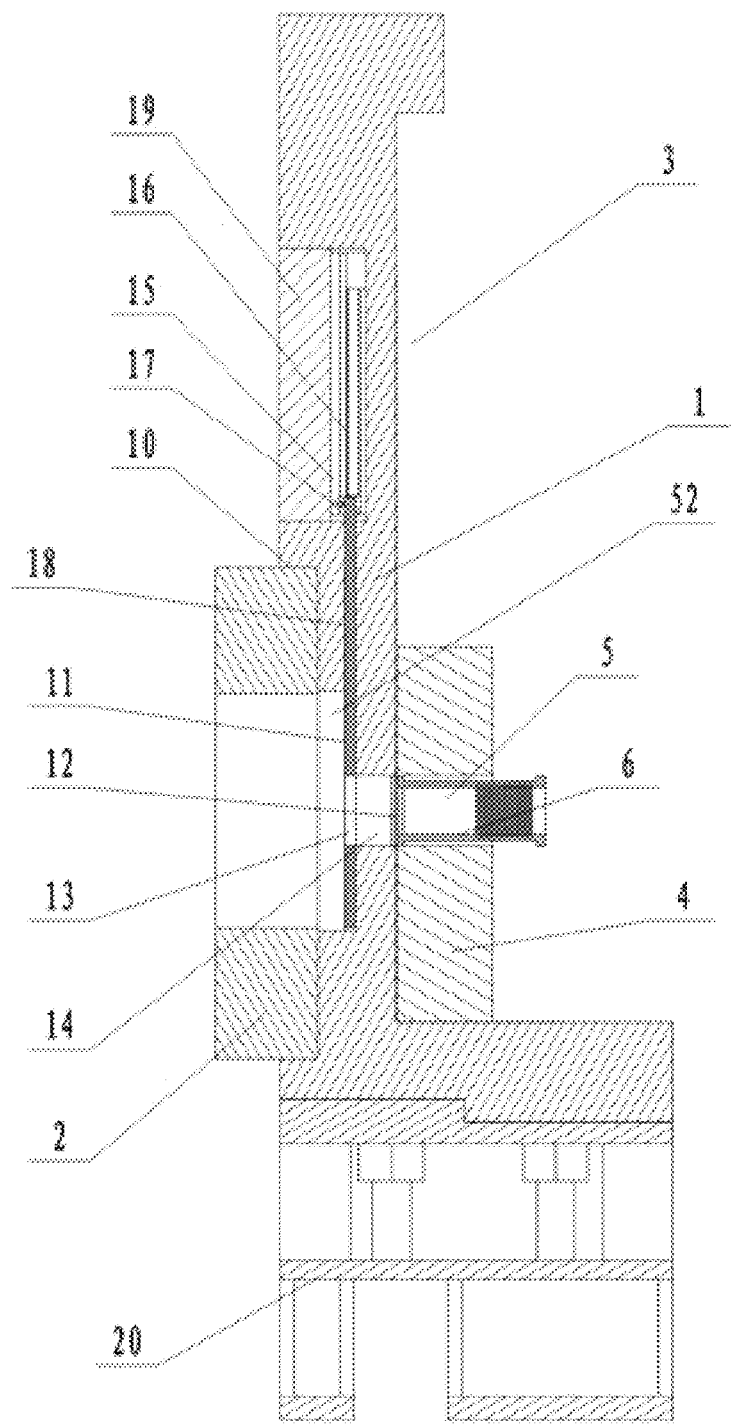
FIG. 8 is a cross-sectional view of Embodiment 6 of the present invention.

Embodiment 6: a boron neutron capture therapy device compatible with a rotating target and a fixed target (see FIG. 8). Its structure is similar to that of Embodiment 1 or Embodiment 4. The main difference is that in this embodiment, a moderator core is disposed inside a reflector module 2, a sinking groove 52 is disposed on a base platform 1, a fully through hole 14 is disposed at a bottom of the sinking groove 52, and one end of the moderator core is placed in the sinking groove 52. The sinking groove 52 is disposed at a bottom of a mounting groove 10. A lower portion of a curtain 11 is placed in the sinking groove 52. Other structures are the same as those in Embodiment 1 or Embodiment 4.

As an optimized design, the sinking groove 52 can make the moderator core closer to a target material 12. The setting of the sinking groove 52 allows the moderator core to further extend out of the reflector module 2 and get closer to the target material 12. The base platform 1 acts as a reflector at the same time.

The above embodiments are merely preferred solutions of the present invention, and do not limit the present invention in any form. There are still other variations and modifications without departing from the technical solutions described in the claims.

What is claimed is:

1. A boron neutron capture therapy device compatible with a rotating target and a fixed target, comprising a beam shaping body and a vacuum pipeline, wherein the beam shaping body comprises a base platform, two sides of the base platform are each provided with a reflector module and a back reflector, and a compatible cavity configured for accommodating a rotating target module is disposed on the base platform; when the rotating target is adopted, the rotating target module is mounted in the compatible cavity, and the vacuum pipeline is connected with the rotating target module; and when the fixed target is adopted, the fixed target is detachably mounted on the vacuum pipeline.

2. The boron neutron capture therapy device compatible with the rotating target and the fixed target according to claim 1, wherein the base platform and the reflector module are correspondingly provided with a mounting groove, and the reflector module is adaptively connected with the mounting groove.

3. The boron neutron capture therapy device compatible with the rotating target and the fixed target according to claim 1, wherein a fully through hole for the fixed target to pass through is disposed on the base platform.

4. The boron neutron capture therapy device compatible with the rotating target and the fixed target according to claim 3, wherein a moderator core is disposed inside the reflector module, a sinking groove is disposed on the base platform, the fully through hole is disposed at a bottom of the sinking groove, and an end of the moderator core is placed in the sinking groove.

5. The boron neutron capture therapy device compatible with the rotating target and the fixed target according to claim 1, wherein a surface of the base platform sinks to form the compatible cavity.

6. The boron neutron capture therapy device compatible with the rotating target and the fixed target according to claim 1, wherein the base platform has a frame-like structure, and an internal space of the base platform of the frame-like structure forms the compatible cavity.

7. The boron neutron capture therapy device compatible with the rotating target and the fixed target according to claim 1, wherein a fixed seat is disposed below the base platform, an adjusting cushion block is mounted at a bottom of the base platform, a plurality of liftable support columns are mounted on the fixed seat, and the plurality of liftable support columns support the adjusting cushion block.

8. The boron neutron capture therapy device compatible with the rotating target and the fixed target according to claim 1, wherein a fixed seat is disposed below the base platform, a base platform cushion block and a reflector cushion block are disposed on the fixed seat, a back reflector cushion block is disposed on the base platform cushion block, liftable base platform support columns and liftable reflector support columns are mounted on the fixed seat, liftable back reflector support columns are mounted on the base platform cushion block, the liftable base platform support columns support the base platform cushion block, the liftable reflector support columns support the reflector cushion block, and the liftable back reflector support columns support the back reflector cushion block; and the base platform is mounted on the base platform cushion block, the reflector module is mounted on the reflector cushion block, and the back reflector is mounted on the back reflector cushion block.

9. The boron neutron capture therapy device compatible with the rotating target and the fixed target according to claim 1, wherein a movably disposed curtain is mounted on the base platform, and a movement of the movably disposed curtain is configured for blocking the rotating target module or the fixed target in a direction of a neutron transmission.

10. The boron neutron capture therapy device compatible with the rotating target and the fixed target according to claim 9, wherein the base platform is provided with a connecting groove, a sliding rail is mounted inside the connecting groove, a sliding seat is slidably mounted on the sliding rail, the movably disposed curtain is tightly connected with the sliding seat, a slot is disposed on a side wall of the connecting groove, and the movably disposed curtain is adaptively connected with the slot in a plug-in manner.

11. The boron neutron capture therapy device compatible with the rotating target and the fixed target according to claim 9, wherein a through hole is disposed on the movably disposed curtain, and the movement of the movably disposed curtain makes the through hole align with or misalign with and separate from the direction of the neutron transmission.

12. The boron neutron capture therapy device compatible with the rotating target and the fixed target according to claim 1, wherein the rotating target module comprises a mounting housing and the rotating target located inside the mounting housing, the rotating target comprises a target disk and a plurality of target materials, the target disk is connected to a main shaft, and the plurality of target materials are circumferentially disposed on the target disk to form an annular structure.

13. A method for replacing a rotating target and a fixed target of a boron neutron capture therapy device, wherein a target replacement operation for the boron neutron capture therapy device compatible with the rotating target and the fixed target according to claim 1 is achieved, comprising replacing the fixed target with the rotating target and replacing the rotating target with the fixed target; wherein replacing the fixed target with the rotating target comprises the following steps: separating the vacuum pipeline and the back reflector from each other, and transferring the back reflector; mounting the rotating target module to the compatible cavity, and disassembling the fixed target on the vacuum pipeline; re-mounting the back reflector to a position of the compatible cavity, with the back reflector adjacent to the rotating target; and passing the vacuum pipeline through the back reflector, and connecting the vacuum pipeline with the rotating target to achieve the target replacement operation; and wherein replacing the rotating target with the fixed target comprises the following steps: separating the vacuum pipeline from the rotating target, and moving the vacuum pipeline outward to retreat to an exterior of the back reflector; transferring the back reflector; transferring the rotating target module; re-mounting the back reflector to the position of the compatible cavity; and mounting the fixed target on the vacuum pipeline, and extending the vacuum pipeline into the back reflector to achieve the target replacement operation.

14. The boron neutron capture therapy device compatible with the rotating target and the fixed target according to claim 2, wherein a fixed seat is disposed below the base platform, an adjusting cushion block is mounted at a bottom of the base platform, a plurality of liftable support columns are mounted on the fixed seat, and the plurality of liftable support columns support the adjusting cushion block.

15. The boron neutron capture therapy device compatible with the rotating target and the fixed target according to claim 3, wherein a fixed seat is disposed below the base platform, an adjusting cushion block is mounted at a bottom of the base platform, a plurality of liftable support columns are mounted on the fixed seat, and the plurality of liftable support columns support the adjusting cushion block.

16. The boron neutron capture therapy device compatible with the rotating target and the fixed target according to claim 4, wherein a fixed seat is disposed below the base platform, an adjusting cushion block is mounted at a bottom of the base platform, a plurality of liftable support columns are mounted on the fixed seat, and the plurality of liftable support columns support the adjusting cushion block.

17. The boron neutron capture therapy device compatible with the rotating target and the fixed target according to claim 5, wherein a fixed seat is disposed below the base platform, an adjusting cushion block is mounted at a bottom of the base platform, a plurality of liftable support columns are mounted on the fixed seat, and the plurality of liftable support columns support the adjusting cushion block.

18. The boron neutron capture therapy device compatible with the rotating target and the fixed target according to claim 6, wherein a fixed seat is disposed below the base platform, an adjusting cushion block is mounted at a bottom of the base platform, a plurality of liftable support columns are mounted on the fixed seat, and the plurality of liftable support columns support the adjusting cushion block.

19. The boron neutron capture therapy device compatible with the rotating target and the fixed target according to claim 2, wherein a fixed seat is disposed below the base platform, a base platform cushion block and a reflector cushion block are disposed on the fixed seat, a back reflector cushion block is disposed on the base platform cushion block, liftable base platform support columns and liftable reflector support columns are mounted on the fixed seat, liftable back reflector support columns are mounted on the base platform cushion block, the liftable base platform support columns support the base platform cushion block, the liftable reflector support columns support the reflector cushion block, and the liftable back reflector support columns support the back reflector cushion block; and the base platform is mounted on the base platform cushion block, the reflector module is mounted on the reflector cushion block, and the back reflector is mounted on the back reflector cushion block.

20. The boron neutron capture therapy device compatible with the rotating target and the fixed target according to claim 3, wherein a fixed seat is disposed below the base platform, a base platform cushion block and a reflector cushion block are disposed on the fixed seat, a back reflector cushion block is disposed on the base platform cushion block, liftable base platform support columns and liftable reflector support columns are mounted on the fixed seat, liftable back reflector support columns are mounted on the base platform cushion block, the liftable base platform support columns support the base platform cushion block, the liftable reflector support columns support the reflector cushion block, and the liftable back reflector support columns support the back reflector cushion block; and the base platform is mounted on the base platform cushion block, the reflector module is mounted on the reflector cushion block, and the back reflector is mounted on the back reflector cushion block.

* * * * *